United States Patent
Martin et al.

(10) Patent No.: US 8,794,024 B2
(45) Date of Patent: Aug. 5, 2014

(54) REFRIGERATOR ICE COMPARTMENT LATCH AND COVER

(75) Inventors: Dean A. Martin, Solon, IA (US); Chad J. Rotter, Amana, IA (US)

(73) Assignee: Whirlpool Corporation, Benton Harbor, MI (US)

(*) Notice: Subject to any disclaimer, the term of this patent is extended or adjusted under 35 U.S.C. 154(b) by 540 days.

(21) Appl. No.: 12/955,047

(22) Filed: Nov. 29, 2010

(65) Prior Publication Data

US 2011/0067430 A1   Mar. 24, 2011

Related U.S. Application Data

(63) Continuation of application No. 12/694,307, filed on Jan. 27, 2010, now Pat. No. 7,870,754, which is a continuation of application No. 11/331,883, filed on Jan. 13, 2006, now Pat. No. 7,726,148, which is a continuation-in-part of application No. 11/139,237, filed on May 27, 2005, now Pat. No. 7,337,620, which is a continuation-in-part of application No. 11/131,701, filed on May 18, 2005, now Pat. No. 7,284,390.

(51) Int. Cl.
*F25C 5/18* (2006.01)
*F25D 3/02* (2006.01)

(52) U.S. Cl.
USPC .................................... 62/344; 62/420

(58) Field of Classification Search
USPC ................... 62/344, 420, 424, 441, 402
See application file for complete search history.

(56) References Cited

U.S. PATENT DOCUMENTS 2,711,944 A * 6/1955 Meek et al. ............... 312/333
3,280,584 A * 10/1966 Grimm et al. ............... 62/344
3,902,331 A    9/1975 True, Jr. et al.
(Continued)

FOREIGN PATENT DOCUMENTS

CN    1340685 A    3/2002
CN    1412509 A    4/2003
(Continued)

OTHER PUBLICATIONS

JP 2-29589—English Translation.
(Continued)

*Primary Examiner* — Cassey D Bauer

(57) ABSTRACT

An insulated icemaking compartment is provided in the fresh food compartment of a bottom mount refrigerator. The icemaking compartment may be integrally formed with the liner of the fresh food compartment, or alternatively, may be modular for installation anywhere in the fresh food compartment. A removable bin assembly with a front cover normally seals the icemaking compartment to maintain the temperature in the compartment. A cold air duct formed in the rear wall of the refrigerator supplies cold air from the freezer compartment to the icemaking compartment. A return air duct directs a portion of the air from the icemaking compartment back to the freezer compartment. An air vent with a damper in the icemaking compartment directs another portion of air into the fresh food compartment. A control system provides for controlling refrigerator functions in a manner that promotes energy efficiency, including movement of the damper between open and closed positions. An improved latch and seal are provided for the ice bin assembly to allow removal of the bin assembly and to ensure a positive seal between the bin assembly and the front cover of the ice compartment.

11 Claims, 15 Drawing Sheets

(56) References Cited

U.S. PATENT DOCUMENTS

| | | | |
|---|---|---|---|
| 4,209,999 | A | 7/1980 | Falk et al. |
| 4,333,588 | A | 6/1982 | Schreck et al. |
| 4,872,318 | A | 10/1989 | Klemmensen |
| 5,037,004 | A | 8/1991 | Katz et al. |
| 5,056,688 | A | 10/1991 | Goetz et al. |
| D324,869 | S | 3/1992 | Carper |
| 5,272,888 | A * | 12/1993 | Fisher et al. ............... 62/344 |
| 2,717,505 | A | 9/1995 | Andersson |
| D372,739 | S | 8/1996 | Bustos |
| 6,574,982 | B1 | 6/2003 | Wiseman et al. |
| D484,150 | S | 12/2003 | Becke |
| 6,735,959 | B1 * | 5/2004 | Najewicz ............... 62/3.63 |
| 7,228,703 | B2 | 6/2007 | Kim et al. |
| D549,745 | S | 8/2007 | Coulter et al. |
| 7,266,972 | B2 | 9/2007 | Anselmino et al. |
| 7,284,390 | B2 | 10/2007 | Van Meter et al. |
| 7,591,141 | B2 | 9/2009 | Wetekamp et al. |
| 7,870,754 | B2 | 1/2011 | Martin et al. |
| 8,117,863 | B2 | 2/2012 | Van Meter et al. |
| 2006/0086128 | A1 | 4/2006 | Maglinger et al. |
| 2006/0086129 | A1 | 4/2006 | Anselmino et al. |
| 2006/0086130 | A1 | 4/2006 | Anselmino et al. |
| 2006/0086131 | A1 | 4/2006 | Pastryk et al. |
| 2006/0086132 | A1 | 4/2006 | Maglinger et al. |
| 2006/0201189 | A1 | 9/2006 | Adamski et al. |
| 2006/0266055 | A1 | 11/2006 | Anderson et al. |
| 2007/0245762 | A1 | 10/2007 | Maglinger et al. |
| 2008/0011010 | A1 | 1/2008 | Koons et al. |
| 2008/0016900 | A1 | 1/2008 | Bippus et al. |
| 2008/0041090 | A1 | 2/2008 | Lee et al. |
| 2008/0134709 | A1 | 6/2008 | Fischer et al. |
| 2008/0168794 | A1 | 7/2008 | Cho et al. |
| 2008/0289355 | A1 | 11/2008 | Kang et al. |
| 2009/0038330 | A1 | 2/2009 | Lee et al. |
| 2009/0064703 | A1 | 3/2009 | Kim et al. |
| 2009/0064704 | A1 | 3/2009 | Wu et al. |
| 2009/0173098 | A1 | 7/2009 | Kim et al. |
| 2009/0255289 | A1 | 10/2009 | Friedmann et al. |
| 2010/0037631 | A1 | 2/2010 | Choi et al. |
| 2010/0050677 | A1 | 3/2010 | Lu et al. |
| 2010/0050681 | A1 | 3/2010 | Ryu et al. |
| 2010/0058796 | A1 | 3/2010 | Kim |
| 2010/0077789 | A1 | 4/2010 | Lim et al. |
| 2010/0199701 | A1 | 8/2010 | Yoon et al. |
| 2010/0257887 | A1 | 10/2010 | Hwang |
| 2010/0287970 | A1 | 11/2010 | Choi |

FOREIGN PATENT DOCUMENTS

| | | | |
|---|---|---|---|
| JP | 49-77571 | B | 7/1974 |
| JP | 51-21165 | | 2/1976 |
| JP | 56-47453 | | 4/1981 |
| JP | 2-29589 | A | 1/1990 |
| JP | 2-103382 | A | 4/1990 |
| JP | 4-15477 | A | 1/1992 |
| JP | 4-222378 | A | 8/1992 |
| JP | 5-10660 | A | 1/1993 |
| JP | 5-66084 | A | 3/1993 |
| JP | 5-71849 | A | 3/1993 |
| JP | 5-79367 | U | 10/1993 |
| JP | 6-11228 | A | 1/1994 |
| JP | 6-147743 | A | 5/1994 |
| JP | 7-19701 | A | 1/1995 |
| JP | 7-174453 | A | 7/1995 |
| JP | 7-294115 | A | 11/1995 |
| JP | 7-301479 | A | 11/1995 |
| JP | 7-305946 | A | 11/1995 |
| JP | 8-61824 | A | 3/1996 |
| JP | 8-271110 | A | 10/1996 |
| JP | 9-145210 | A | 6/1997 |
| JP | 9-303944 | A | 11/1997 |
| JP | 11-101544 | A | 4/1999 |
| JP | 11-211308 | A | 8/1999 |
| JP | 2000-9372 | A | 1/2000 |
| JP | 2000-111229 | A | 4/2000 |
| JP | 2000-161830 | A | 6/2000 |
| JP | 2000-266458 | A | 9/2000 |
| JP | 2000-337760 | A | 12/2000 |
| JP | 2001-116410 | A | 4/2001 |
| JP | 2001-349657 | A | 12/2001 |
| JP | 2002-139271 | A | 5/2002 |
| JP | 2002-181429 | A | 6/2002 |
| JP | 2003-10896 | A | 1/2003 |
| JP | 2003-114075 | A | 4/2003 |
| JP | 2003-121043 | A | 4/2003 |
| JP | 2003-262438 | A | 9/2003 |
| JP | 2004-53092 | A | 2/2004 |
| JP | 3545617 | B2 | 4/2004 |
| JP | 2006105418 | A2 | 4/2006 |
| JP | 4032673 | B2 | 11/2007 |
| KR | 1988-0000896 | A | 3/1988 |
| KR | 1994-0011915 | A | 6/1994 |
| KR | 95-25387 | A | 9/1995 |
| KR | 1996-0018479 | A | 6/1996 |
| KR | 1997-0059690 | A | 8/1997 |
| KR | 1999-001784 | A | 1/1999 |
| KR | 1999-007058 | A | 1/1999 |
| KR | 1999-0156726 | B1 | 1/1999 |
| KR | 1999-0034649 | A | 5/1999 |
| KR | 1999-0182534 | B1 | 5/1999 |
| KR | 1999-0021510 | U | 6/1999 |
| KR | 1999-0031599 | U | 7/1999 |
| KR | 1999-0056269 | A | 7/1999 |
| KR | 200164305 | Y1 | 10/1999 |
| KR | 20-0256596 | Y1 | 12/2001 |
| KR | 10-0356542 | B1 | 10/2002 |
| KR | 2003-0018246 | A | 3/2003 |
| KR | 2003-0030961 | A | 4/2003 |
| KR | 2003-0092871 | A | 12/2003 |
| KR | 30-0355715 | S | 7/2004 |
| KR | 2004-00571587 | A | 7/2004 |
| KR | 2004-0102570 | A | 12/2004 |
| KR | 2005-0023863 | A | 3/2005 |
| KR | 2005-0028227 | A | 3/2005 |
| KR | 2005-0028656 | A | 3/2005 |
| KR | 2005-0028657 | A | 3/2005 |
| KR | 2005-0028658 | A | 3/2005 |
| KR | 2005-0094673 | A | 9/2005 |
| KR | 2005-0117536 | A | 12/2005 |
| WO | WO2008/135473 | A2 | 11/2008 |

OTHER PUBLICATIONS

JP 2-103382, Matsushita Refrig Co Ltd—English Translation.
JP 6-147743, Hitachi Ltd—English Translation.
JP 9-145210, Mitsubishi Electric Corp—English Translation.
JP 9-303944, Sanyo Electric Co Ltd—English Translation.
JP 2000-9372, Toshiba Corp—English Translation.
JP 2000-111229—English Translation.
JP 2003-121043—English Translation.
KR 95-25387, Samsung Electronics Co., Ltd.—English Translation.
KR 1999-001784, Samsung Electronics Co., Ltd.—English Translation.
KR 1999-0021510, Daewoo Electronics Co., Ltd.—English Translation.
KR 1999-0182534, Samsung Electronics Co., Ltd.—English Translation.
KR 10-0356542, Samsung Electronics Co., Ltd.—English Translation.
KR 2003-0018246, LG Electronics, Inc.—English Translation.
KR 2003-0030961—English Translation.
KR 2003-0092871—English Translation.
KR 2004-0102570, LG Electronics Inc.—English Translation.
KR 2005-0028656, LG Electronics Inc.—English Translation.

* cited by examiner

REFRIGERATOR ICE COMPARTMENT LATCH AND COVER

CROSS-REFERENCE TO RELATED APPLICATIONS

This application is a continuation of U.S. application Ser. No. 12/694,307 filed Jan. 27, 2010, entitled REFRIGERATOR ICE COMPARTMENT LATCH AND COVER, which is a continuation of U.S. application Ser. No. 11/331,883 filed Jan. 13, 2006, entitled REFRIGERATOR ICE COMPARTMENT LATCH AND SEAL, now issued as U.S. Pat. No. 7,726,148, which is a continuation-in-part application of U.S. application Ser. No. 11/139,237, filed May 27, 2005, entitled INSULATED ICE COMPARTMENT FOR BOTTOM MOUNT REFRIGERATOR, now issued as U.S. Pat. No. 7,337,620, which is a continuation-in-part of and U.S. application Ser. No. 11/131,701, filed May 18, 2005, entitled REFRIGERATOR WITH INTERMEDIATE TEMPERATURE ICEMAKING COMPARTMENT, now issued as U.S. Pat. No. 7,284,390, all of which are herein incorporated by reference in their entirety.

BACKGROUND OF THE INVENTION

Household refrigerators generally come in three structural styles: (1) a side-by-side model wherein the freezer and refrigerator compartments are side by side; (2) a top mount model wherein the freezer compartment is located above the refrigerator compartment; and (3) a bottom mount model wherein the freezer compartment is mounted below the refrigerator compartment. An icemaker is normally provided in the freezer compartment of all three models. A door mounted ice dispenser is often provided in a side-by-side refrigerator and in a top mount refrigerator so that a person can add ice to a glass without opening the freezer or refrigerator door. However, a door mounted ice dispenser normally is not been provided in bottom mount refrigerators, since the freezer door is too low, and there are difficulties in transporting ice from the freezer compartment to the refrigerator compartment which precludes a dispenser in the refrigerator compartment door. However, it is desirable to have an ice dispenser in the refrigerator compartment of a bottom mount refrigerator.

Providing an icemaking compartment within the fresh food compartment of a refrigerator presents numerous issues, both structural and functional. For example, the fresh food compartment is normally about 40° F., while an ice compartment needs to be less than 32° F. in order to make ice effectively and efficiently and is typically at, or about 0° F. Maintaining and controlling the temperature within the icemaking compartment requires insulation, seals, appropriate airflow, and a control system. Placing the icemaking compartment within the fresh food compartment of the refrigerator also requires consideration of electrical connections of the icemaker and the supply of water to the icemaker. The method of manufacturing of such an icemaking compartment within the fresh food compartment of a refrigerator also raises novel and unique considerations which are not factors for an icemaking compartment mounted in a freezer.

U.S. Pat. No. 6,735,959 issued to Najewicz discloses a thermoelectric icemaker placed within the fresh food compartment of a bottom mount refrigerator that may be dispensed through the fresh food door. Najewicz forms ice within the fresh food compartment using the thermoelectric icemaker even though the compartment is above a freezing temperature. Although Najewicz provides for a duct that runs from the freezer compartment to the thermoelectric icemaker, the cold air from the duct is used to remove heat from the thermoelectric icemaker. Najewicz has many problems that must be overcome in order to be practical including the removal of unfrozen water, rapid ice body formation, prolonged ice storage, etc. The present invention overcomes these problems.

SUMMARY OF THE INVENTION

Therefore it is a primary object, feature, or advantage of the present invention to improve over the state of the art.

A further object, feature, or advantage of the present invention is the provision of an improved refrigerator having an icemaking compartment within the fresh food compartment.

Another object, feature, or advantage of the present invention is the provision of a refrigerator having a separate icemaking compartment maintained at a temperature between 0° and 32° F.

A further object, feature, or advantage of the present invention is the provision of a refrigerator having an insulated icemaking compartment remote from the freezer compartment.

A further object, feature, or advantage of the present invention is the provision of a bottom mount refrigerator having an icemaking compartment in the fresh food compartment, and having an insulated and sealed front cover on the icemaking compartment which can be opened to provide access into the compartment.

A further object, feature, or advantage of the present invention is the provision of an icemaking compartment which is formed separately from and mounted into a fresh food compartment of a bottom mount refrigerator.

Another object, feature, or advantage of the present invention is the provision of a method of making a bottom mount refrigerator having an integral ice compartment formed in the liner of the fresh food compartment.

Still another object, feature, or advantage of the present invention is the provision of a control system for an ice compartment within the fresh food compartment of a refrigerator for controlling icemaking and dispensing.

Another object, feature, or advantage of the present invention is the provision of an icemaker in the refrigerator compartment of a bottom mount refrigerator, with a cold air duct to provide air from the freezer compartment to the icemaker.

Still another object, feature, or advantage of the present invention is the provision of an icemaker in the refrigerator compartment of a bottom mount refrigerator having efficient and timely icemaking capacity.

It is a still further object, feature, or advantage of the present invention to provide a refrigerator that is energy efficient.

Another object, feature, or advantage of the present invention is to provide a refrigerator that enhances safety.

Yet another object, feature, or advantage of the present invention is to provide a refrigerator that provides convenience to users.

A further object, feature, or advantage of the present invention is to provide a refrigerator that is aesthetically pleasing to users.

A still further object, feature, or advantage of the present invention is to provide a refrigerator with a control system design that minimizes the complexity and the number of components necessary.

One or more of these and/or other objects, features, or advantages of the present invention will become from the specification and claims that follow.

The bottom mount refrigerator of the present invention has an icemaker within an insulated icemaking compartment in the fresh food or refrigerator compartment. Cold air is supplied to the icemaking compartment from the freezer compartment via a cold air duct. A return air duct extends from the icemaking compartment to the freezer compartment. The icemaking compartment also includes a vent opening for venting air to the refrigerator compartment. A fan draws or forces air through the duct from the freezer compartment to the icemaking compartment. The temperature in the ice making compartment is between 0° F. to 32° F., which is colder than the temperature of the refrigerator compartment, but not as cold as the freezer compartment. The icemaking compartment is preferably located in an upper corner of the refrigerator compartment. The door of the refrigerator compartment includes an ice dispenser to supply ice to a person without opening the refrigerator compartment door. An ice bin for storing ice is removably mounted in the ice compartment.

Preferably, the icemaking compartment is formed integrally with the liner of the fresh food compartment. Alternatively, the icemaking compartment is formed separately from and mounted in the fresh food compartment. The icemaking compartment includes inner and outer shells, with insulation therebetween. An insulated front cover for the ice bin has a latch and seal which provide an air-tight seal with the icemaking compartment when the latch is locked. The latch can be unlocked to allow removal of the ice bin and to provide access to the icemaker.

DETAILED DESCRIPTION OF THE PREFERRED EMBODIMENT

Figure 1:
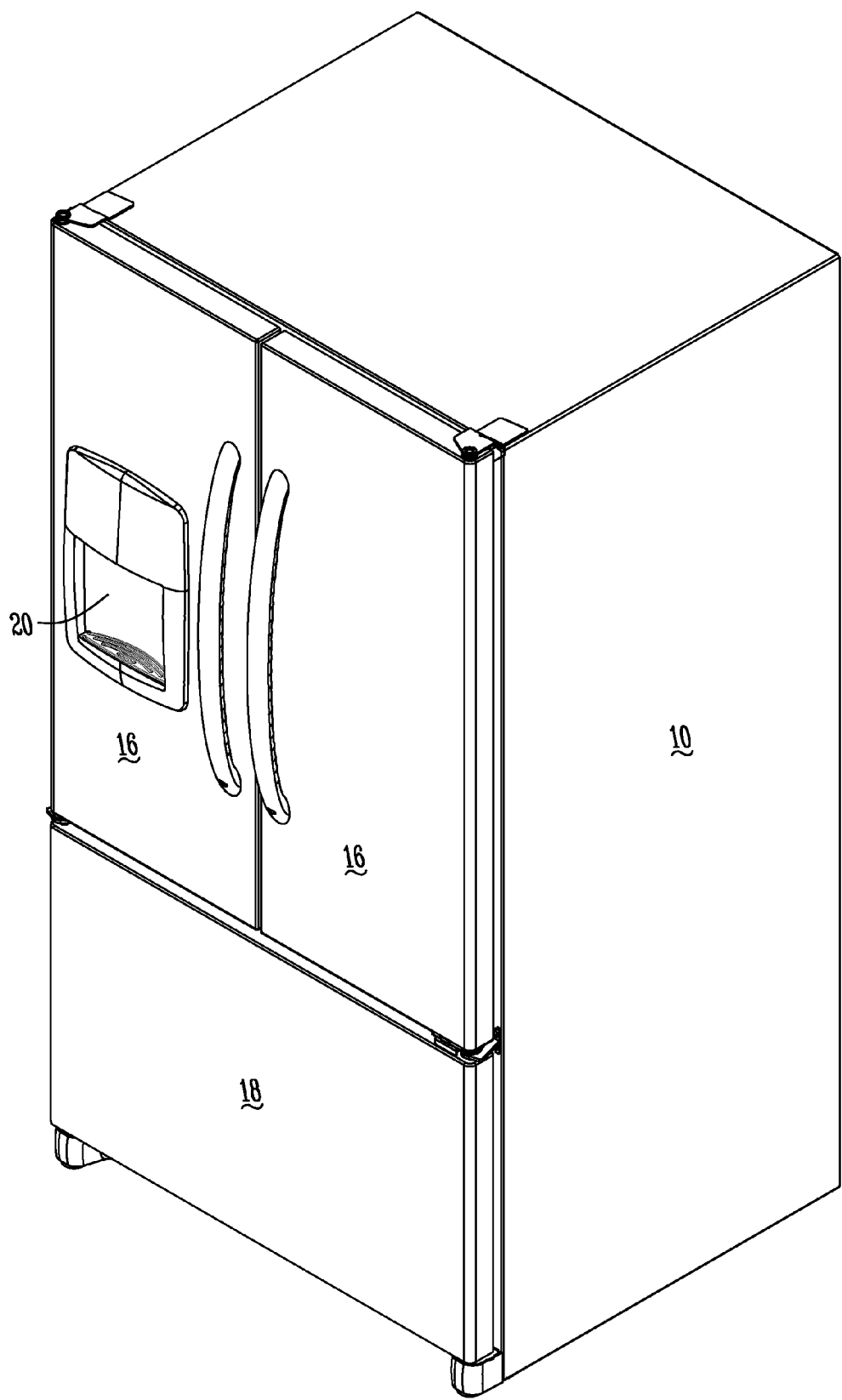
FIG. 1 is a perspective view of a bottom mount refrigerator according to the present invention.
Figure 2:
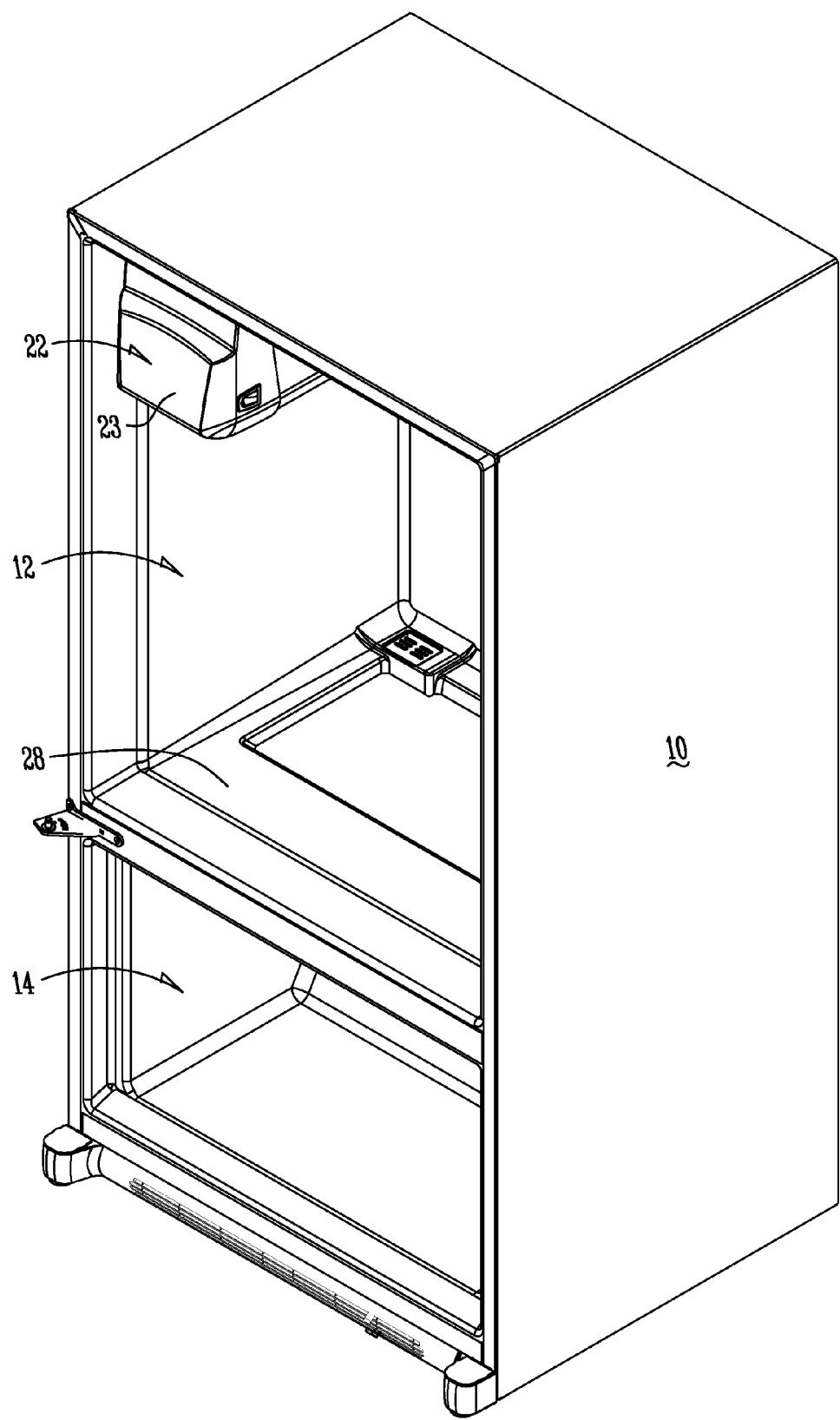
FIG. 2 is a perspective view of the bottom mount refrigerator having the doors removed.

A bottom mount refrigerator is generally designated in the drawings by the reference numeral 10. The refrigerator 10 includes a refrigerator or fresh food compartment 12 and a freezer compartment 14. Doors 16 are provided for the refrigerator compartment or fresh food compartment 12 and a door 18 is provided for the freezer compartment 14. One of the doors 16 includes an ice dispenser 20, which may also include a water dispenser.

Intermediate Temperature Icemaking Compartment

An icemaking compartment or intermediate compartment 22 is provided in the refrigerator compartment 12. The icemaking compartment 22 is shown to be in one of the upper corners of the refrigerator, or fresh food, compartment 12, but other locations are also within the scope of this invention. The icemaking compartment 22 has a front cover 23 that is insulated to prevent the cold air of the icemaking compartment 22 from passing into the refrigerator compartment and opening 21 is provided that mates with chute 19 of the ice dispenser 20. A seal may be provided between the opening 21 and chute 19 to prevent cold air from passing from the icemaking compartment to the refrigerator compartment 12. Chute 19 may be adapted to engage opening 21 upon closing of door 16. Chute 19 and opening 21 may be opposingly angled as to provide added sealing upon closing of door 16. Additionally, an intermediate piece may be used to improve the seal be between chute 19 and opening 21. For example, a resilient seal may be used to assist in achieving this seal. Alternatively, a spring or other elastic material or apparatus may be utilized between or about the junction of chute 19 and opening 21. Other alternatives for sealing between chute 19 and opening 21 should be evident to one skilled in the art.

Additionally, chute 19 should have a blocking mechanism located within or about it to assist in preventing or decreasing the flow of air or heat transfer within chute 19. For example, a flipper door that operates by a solenoid may be placed at the opening 21 to prevent cold air from leaving the icemaking compartment 22 and entering into the refrigerator compartment.

Preferably, the icemaking compartment 22 includes an icemaker 50 (as described below) that forms ice in an environment that is below freezing.

The icemaking compartment 22 may be integrally formed adjacent the refrigerator compartment 12 during the liner forming process and insulation filling process. In such a process the intermediate compartment may be separated on at least one side from the fresh food compartment by the refrigerator liner. Alternatively, the icemaking compartment 22 may be made or assembled remotely from the fresh food compartment and installed in the fresh food compartment 12. For example, this compartment 22 may be slid into the refrigerator compartment 12 on overhead rails (not shown) or other mounting. These methods are discussed subsequently.

The refrigerator 10 includes an evaporator 24 which cools the refrigerator compartment 12 and the freezer compartment 14. Normally, the refrigerator compartment 12 will be maintained at about 40° F. and the freezer compartment 14 will be maintained at approximately 0° F. The icemaking compartment is maintained at a temperature below 32° F. or less in order to form ice, but is preferably not as cold as the freezer compartment 14. Preferably this temperature is in the range of 20° F. The walls of the icemaking compartment are insulated to facilitate temperature control among other aspects. Grates or air vents 26 are provided in the wall 28 between the refrigerator compartment 12 and the freezer compartment 14 to allow air circulation between the compartments.

Air Ducts

Figure 5:
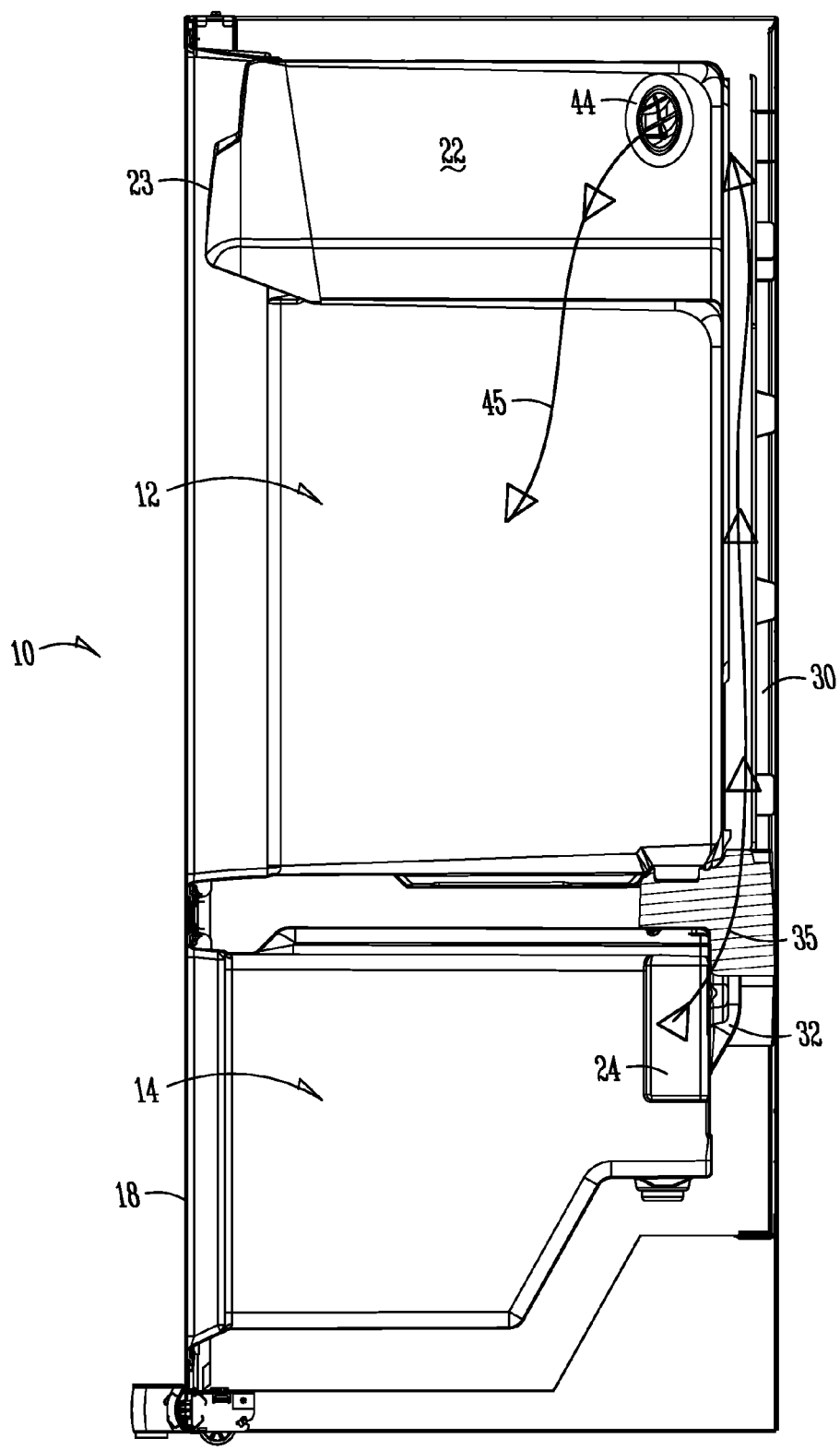
FIG. 5 is a sectional view taken along lines 5-5 of FIG. 4.

A cold air duct 30 extends between the freezer compartment 14 and the icemaking or specialty compartment 22. More particularly, the cold air duct 30 has a lower air inlet 32 within the freezer compartment 14 and an upper outlet end 34 connected to a fan 36 mounted on the back wall of the icemaker 22. The fan 36 draws cold air from the freezer compartment and forces the cold air into the icemaker 22 so as to facilitate icemaking. It is understood that the fan 36 may be located at the inlet end 32 of the cold air duct 30. The fan 36 controls the air flow from the freezer compartment 14 to the icemaking compartment 22 and may be a variable speed fan. The fan can be actuated by conventional means. The cold air duct 30 preferably resides within the rear wall of the refrigerator 10, as seen in FIG. 5. The arrow 35 designates the air flow through the cold air duct 30.

Figure 6:
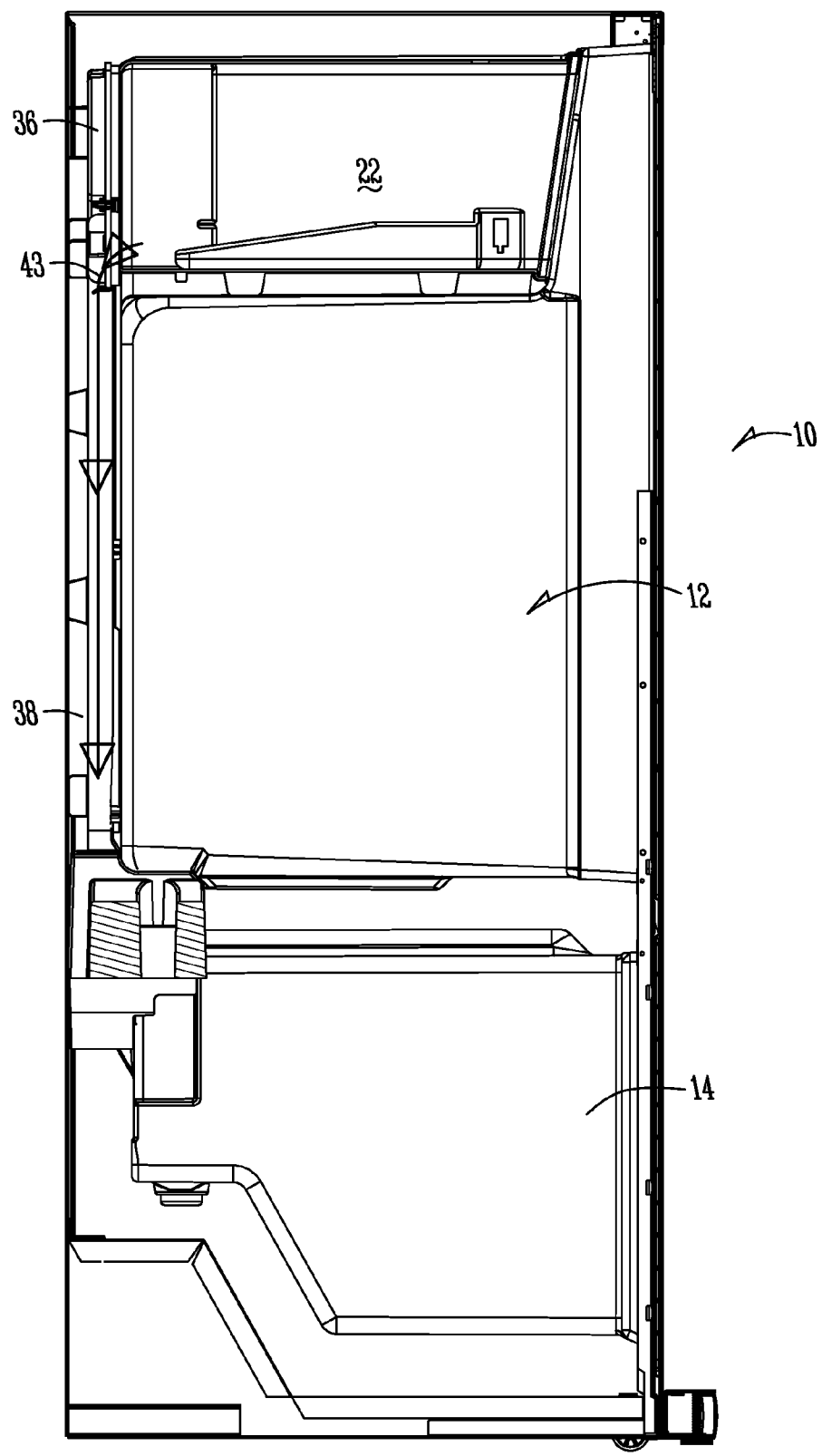
FIG. 6 is a sectional view taken along lines 6-6 of FIG. 4.

The refrigerator 10 also includes a return air duct 38 having an upper end 40 connected to the icemaker 22, and a lower end 42 terminating adjacent one of the air grates 26. Alternatively, the lower end 42 of the return air duct 38 may extend into the freezer compartment 14. Preferably, the return air duct 38 resides within the rear wall of the refrigerator 10, as seen in FIG. 6.

Figure 3:
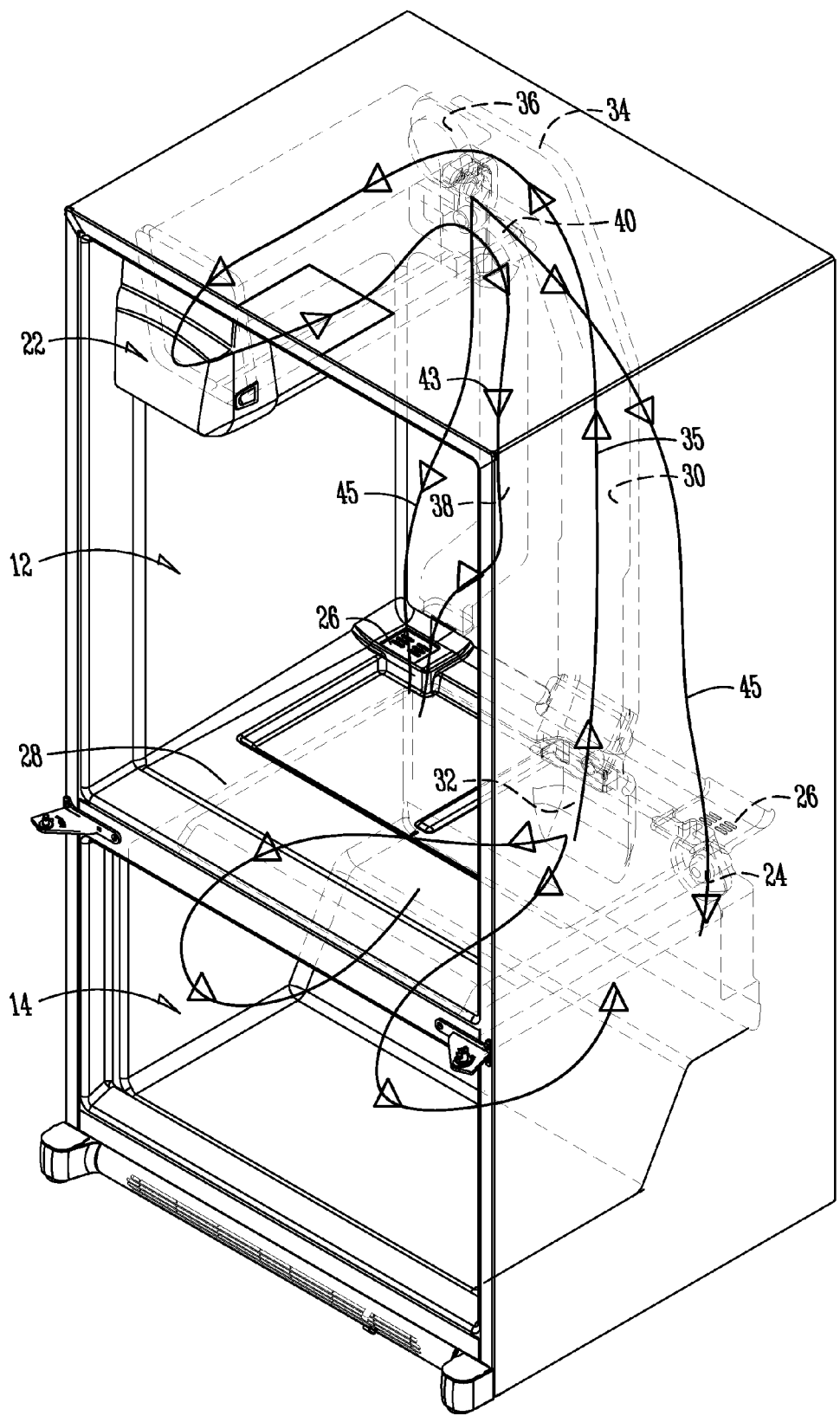
FIG. 3 is a view similar to FIG. 2 showing the cold air duct and return air duct for the icemaking compartment.

The icemaking compartment 22 also has an air vent for discharging air into the refrigerator compartment 14. Thus, a portion of the air from the icemaking compartment 22 is directed through the return air duct 38 to the freezer compartment 14, as indicated by arrow 43 in FIG. 3, and another portion of the icemaking compartment air is vented through the opening 44 into the refrigerator compartment 12, as indicated by arrows 45 in FIG. 3.

Figure 4:
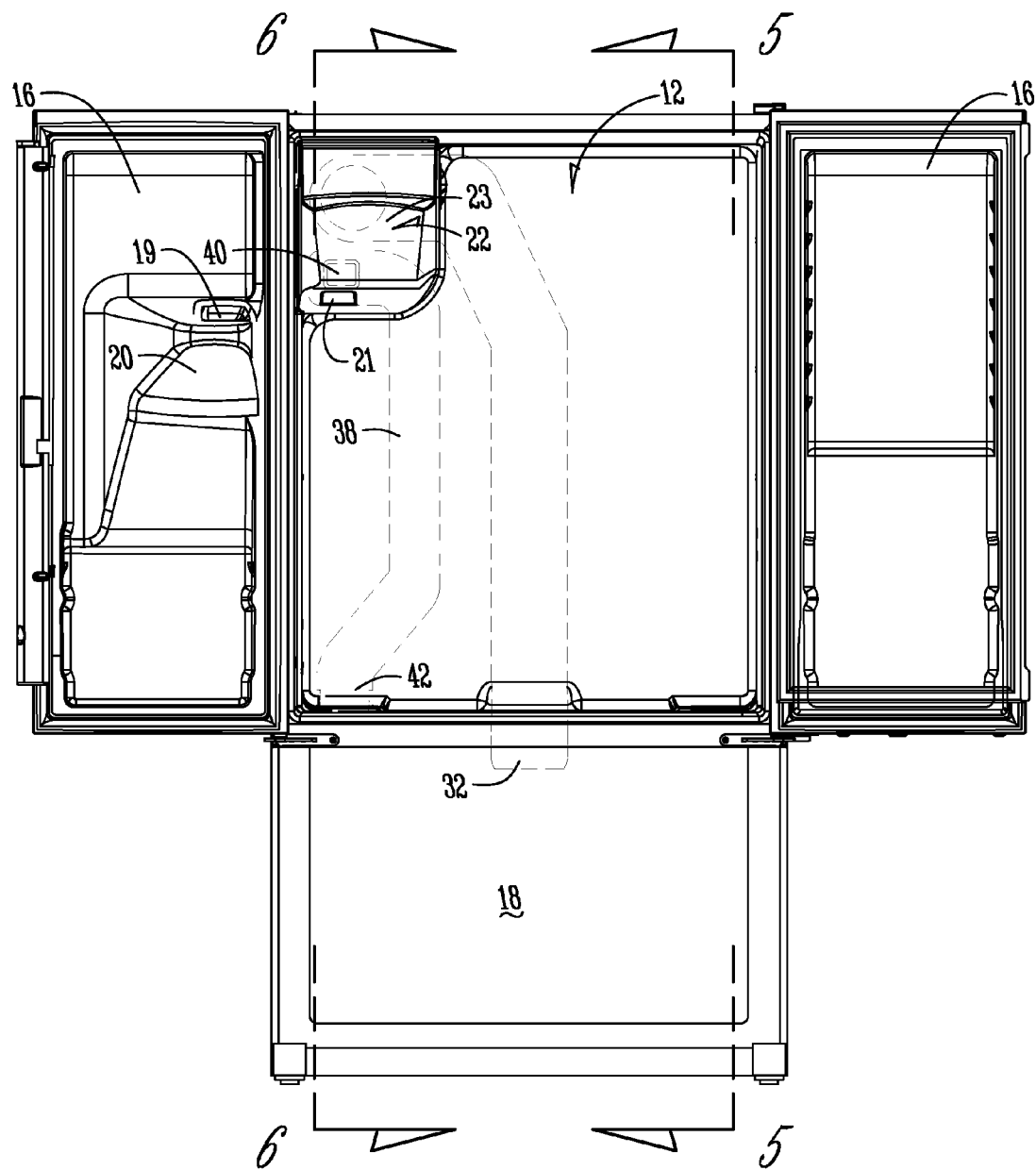
FIG. 4 is a front elevation view of the bottom mount refrigerator of the present invention with the doors open, and illustrating the cold air and return air ducts.

As seen in FIG. 4, the ice is discharged from the icemaker 22 in any conventional manner. Similarly, the ice dispenser 20 functions in a conventional manner.

Icemaker

Figure 7:
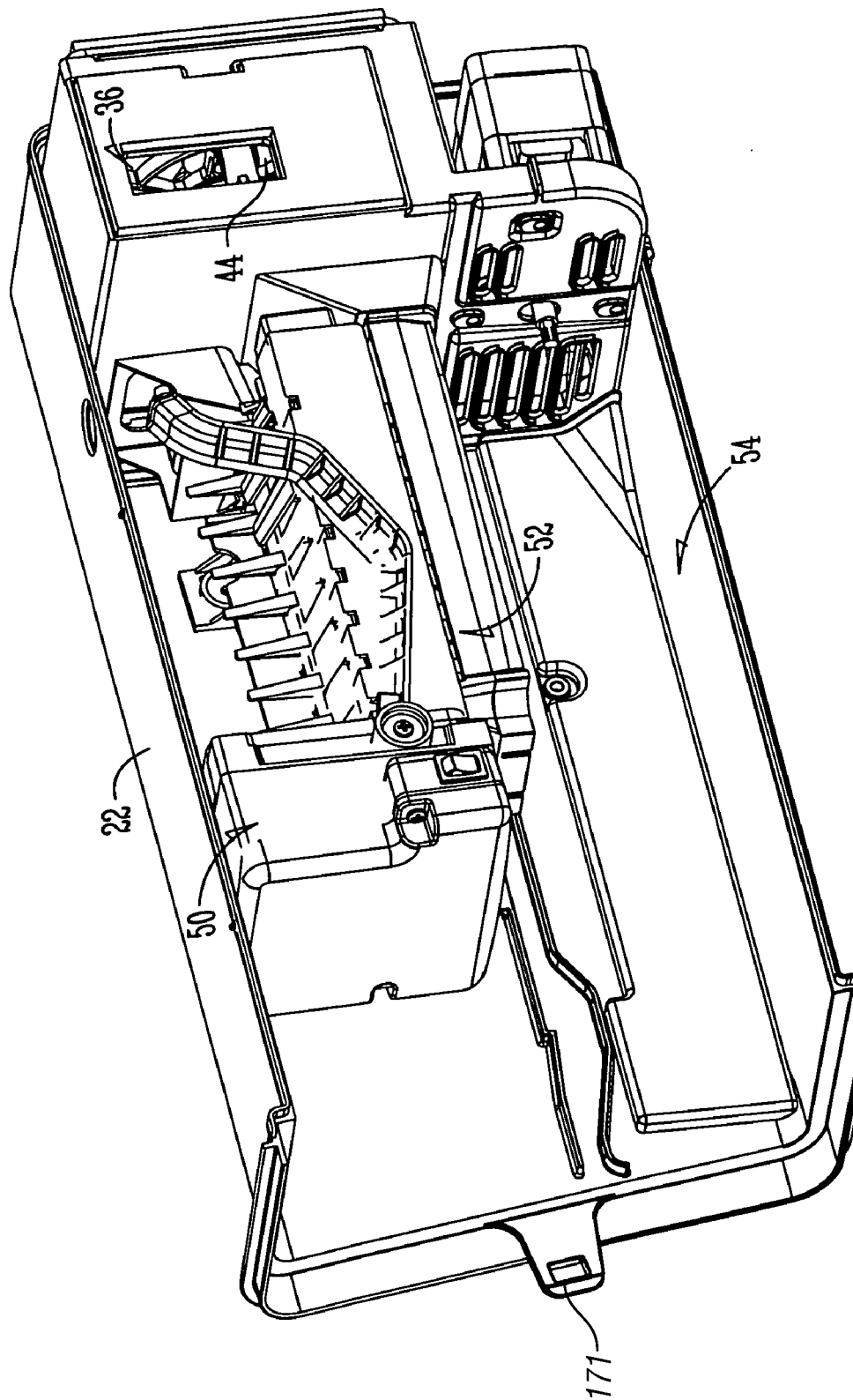
FIG. 7 is a perspective view of the icemaker positioned within the icemaking compartment.
Figure 8:
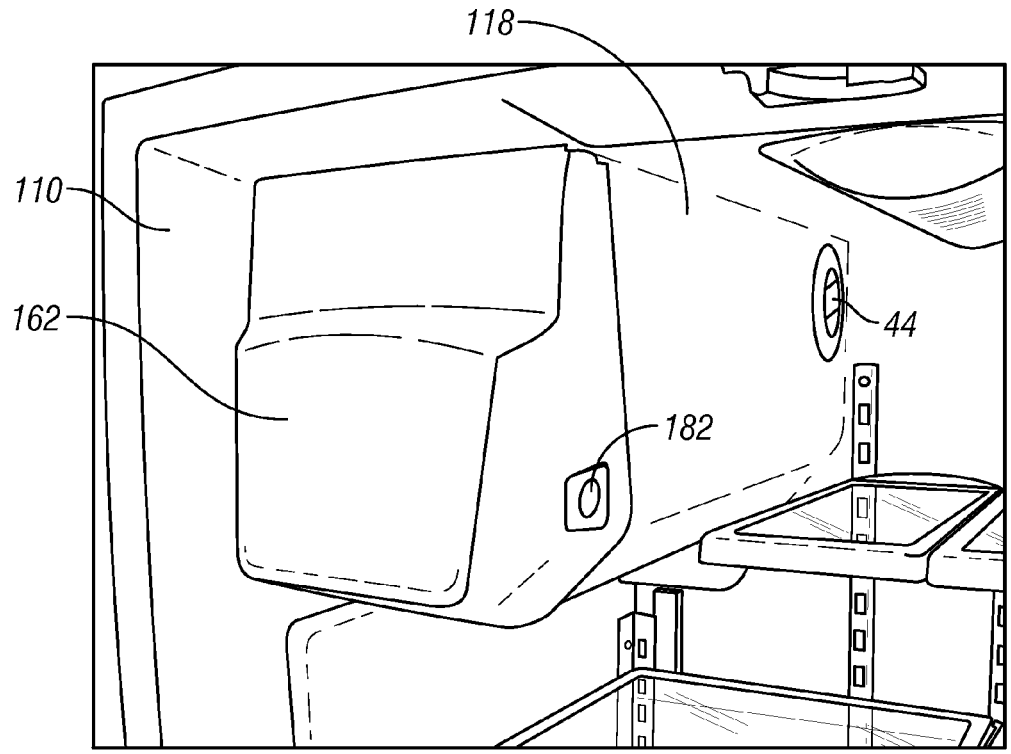
FIG. 8 is a perspective view from the front of the icemaker showing the bin and front cover in a closed position.
Figure 9:
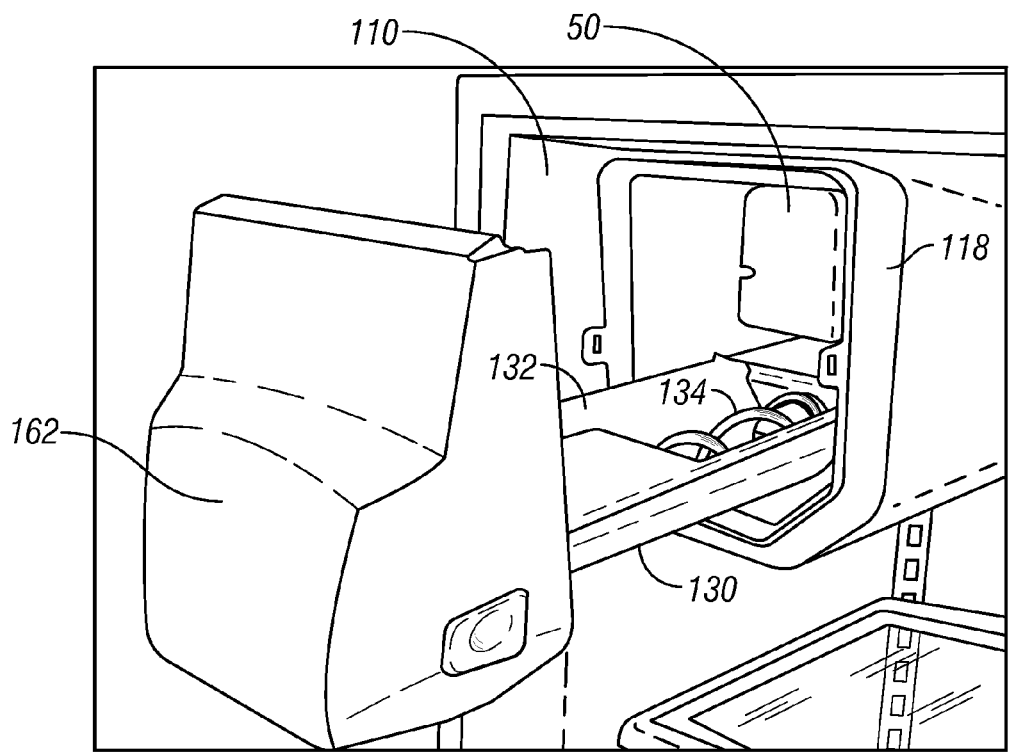
FIG. 9 is a view similar to FIG. 14 showing the bin and front cover in an open position.

As seen in FIG. 7, an icemaker 50 is positioned within the icemaking compartment 22 with the ice storage area 54 with auger (not shown) removed for clarity. The icemaker 50 is mounted to an impingement duct 52. The impingement duct receives freezer air coming from the freezer compartment through the cold air duct 30 and the fan assembly 36. The opening 44 vents air into the refrigerator compartment 12. The auger assembly (not shown) is provided beneath the icemaker 50 along with an ice storage bin with an insulated cover 23. Impingement on the ice maker, as well as other aspects of ice making, is disclosed in Applicant's U.S. application Ser. No. 11/131,701 filed May 18, 2005 entitled REFRIGERATOR WITH IMPROVED ICEMAKER and is hereby incorporated by reference.

Ice Bin Assembly

Figure 10:
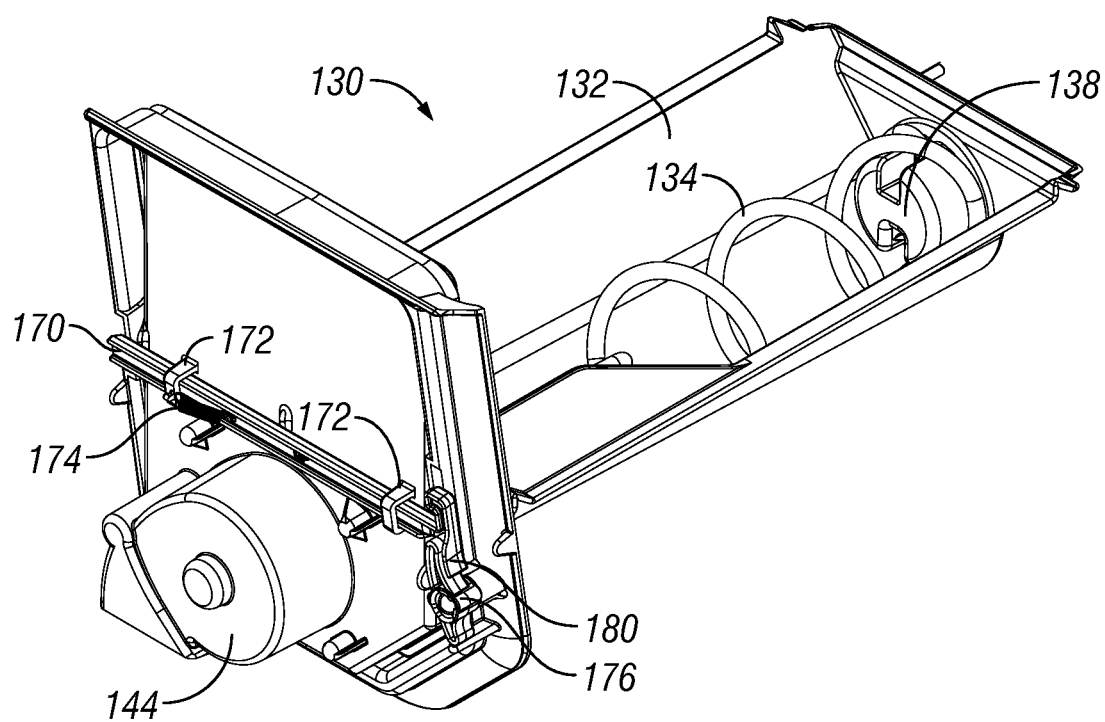
FIG. 10 is a perspective view of the ice pan, auger and motor assembly.
Figure 11:
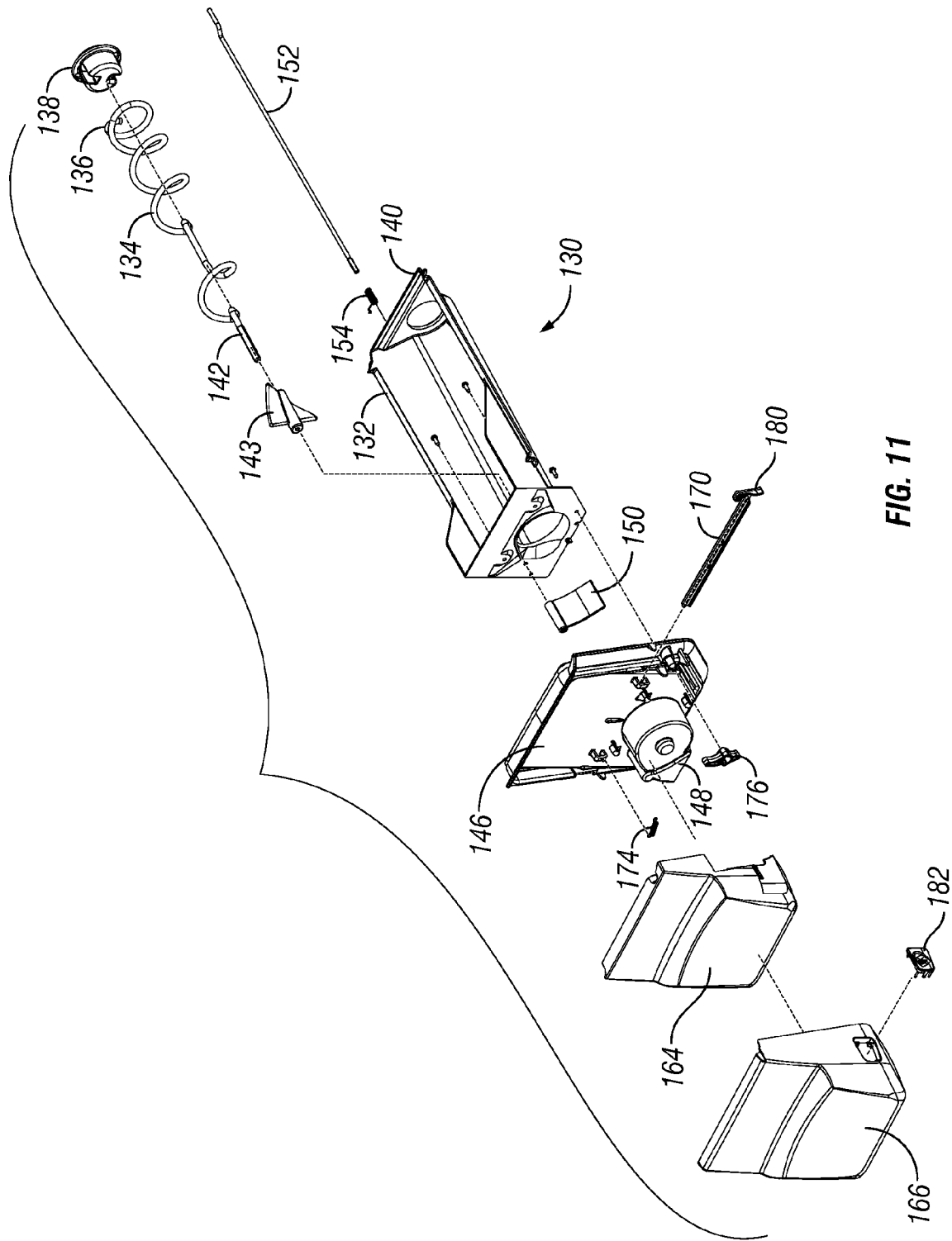
FIG. 11 is an exploded view of the ice pan, auger and motor assembly.

The ice compartment 22 also includes an ice bin assembly 130. The assembly 130 is removable for assembly, service, and user access to bulk ice storage. The components of the bin assembly 130 are shown in FIGS. 10 and 11. The bin assembly 130 includes a tray or bin 132 for receiving ice from the icemaker 50. An auger 134 is mounted within the tray 132, with the first end 136 of the auger 134 being received in a motor 138 which is mounted in the upstream end 140 of the tray 132. The second end 142 of the auger 134 is mounted in a housing 144 on a front plate 146 of the bin assembly 130. A short piece of auger flighting 143 is provided on the second end 142 of the auger 134, within the housing 144. The housing 144 includes an outlet opening 148, with a flipper door 150 in the housing 144 to control opening and closing of the outlet opening 148. The flipper door 150 is mounted upon a shaft 152 extending through the tray 132. A spring 154 mounted on the shaft 152 engages the flipper door 150 to normally bias the door 150 to a closed position over the outlet opening 148. The shaft 152 can be turned by a solenoid (not shown) so as to move the flipper door 150 to an open position relative to the outlet opening 148, such that ice can be discharged from the tray 132 to the dispenser 20.

Front Cover Seal

Figure 12:
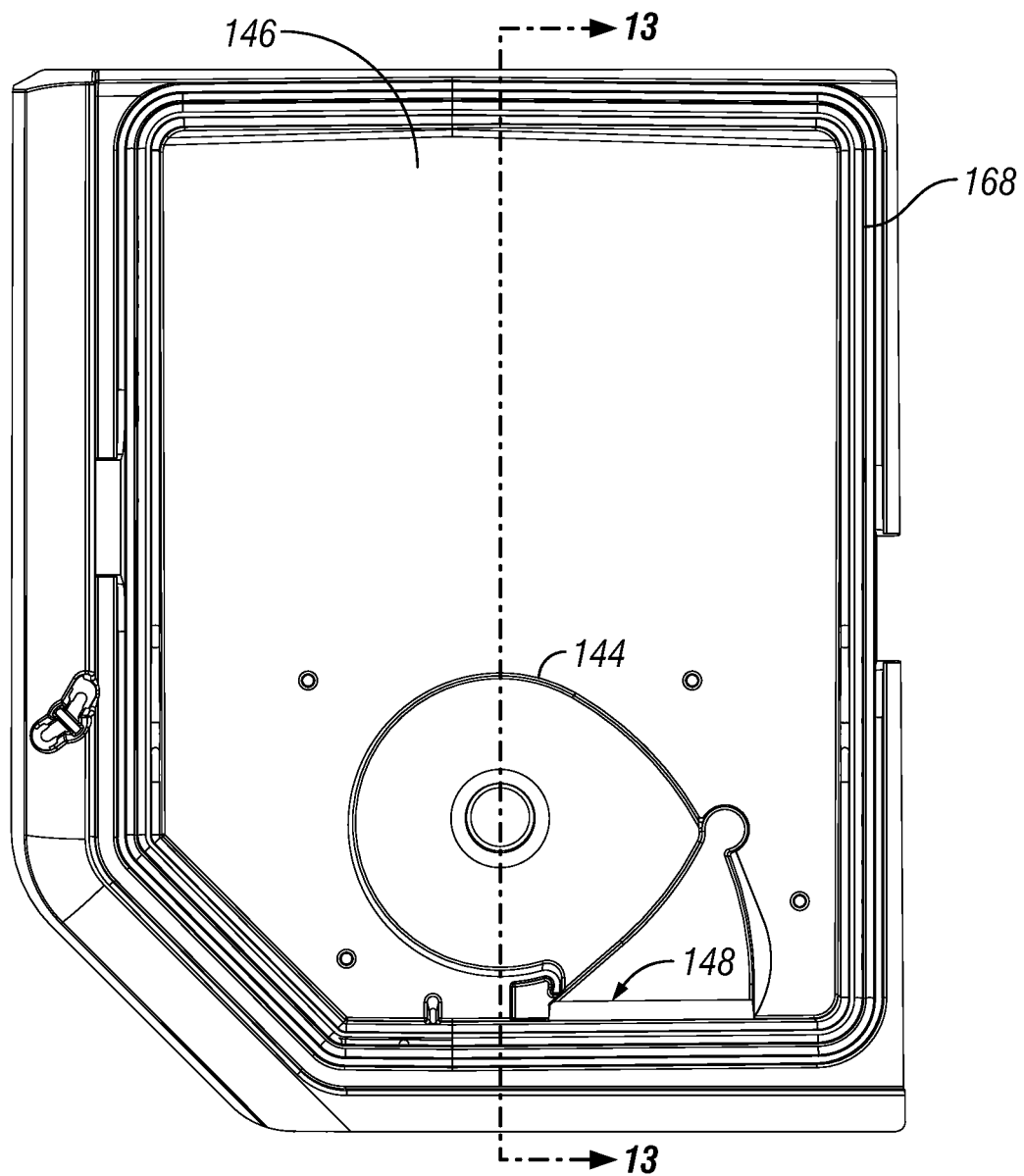
FIG. 12 is a rear elevation view of the bin assembly seal for the icemaking compartment.
Figure 13:
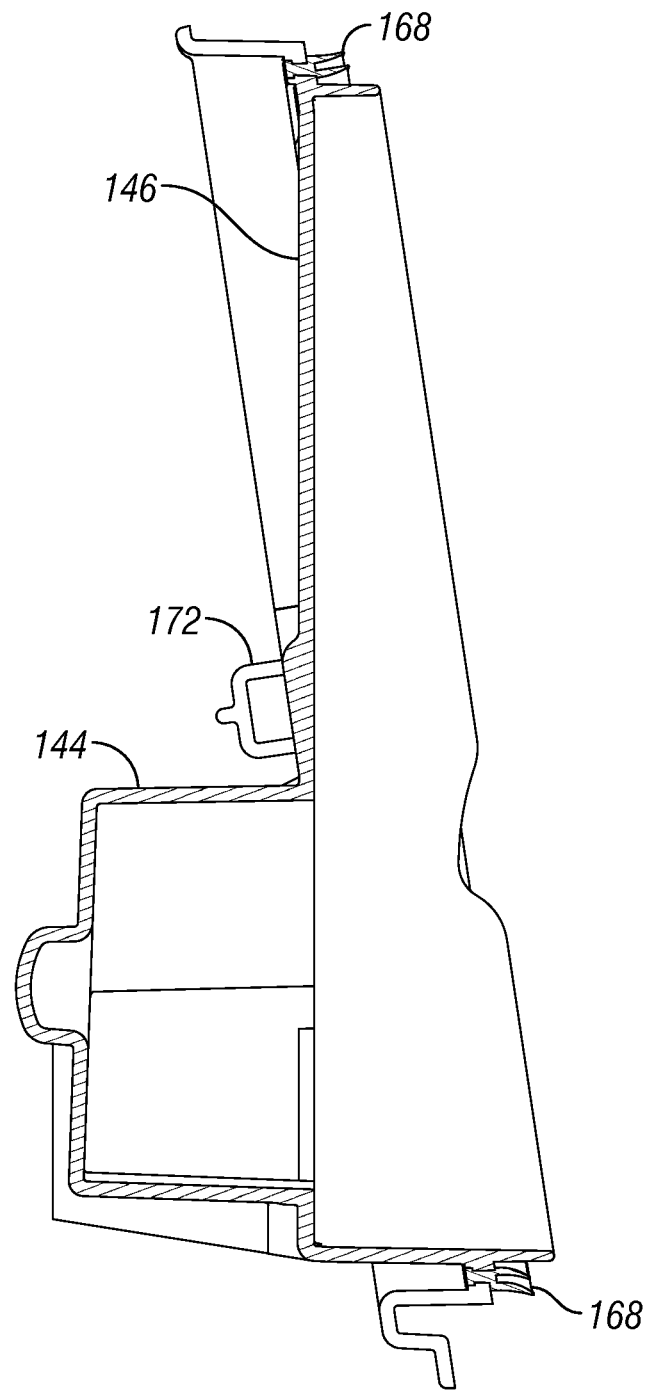
FIG. 13 is a sectional view taken along lines 25-25 of FIG. 12.

A two-piece front cover 162 is provided on the bin assembly 130. The front cover 162 includes an inner panel 164 and an outer panel 166, as best seen in FIG. 11. Insulation is provided between the inner and outer panels 164, 166, such that the front cover 162 is insulated. The inner panel 164 mounts onto the front plate 146 of the bin assembly 130. A seal or compressible gasket 168 (FIG. 12) is provided around the outer perimeter of the front plate 146 so that when the bin assembly 130 is installed into the ice box 122, an air-tight seal is provided between the bin assembly 130 and the front opening 120 of the ice compartment 22. The seal 168 helps maintain the lower temperature of the icemaking compartment 22, as compared to the higher temperature of the fresh food compartment 12. Since the ice compartment 22 is at a lower temperature than the fresh food compartment 12, the two components must be sealed from one another.

Figure 14:
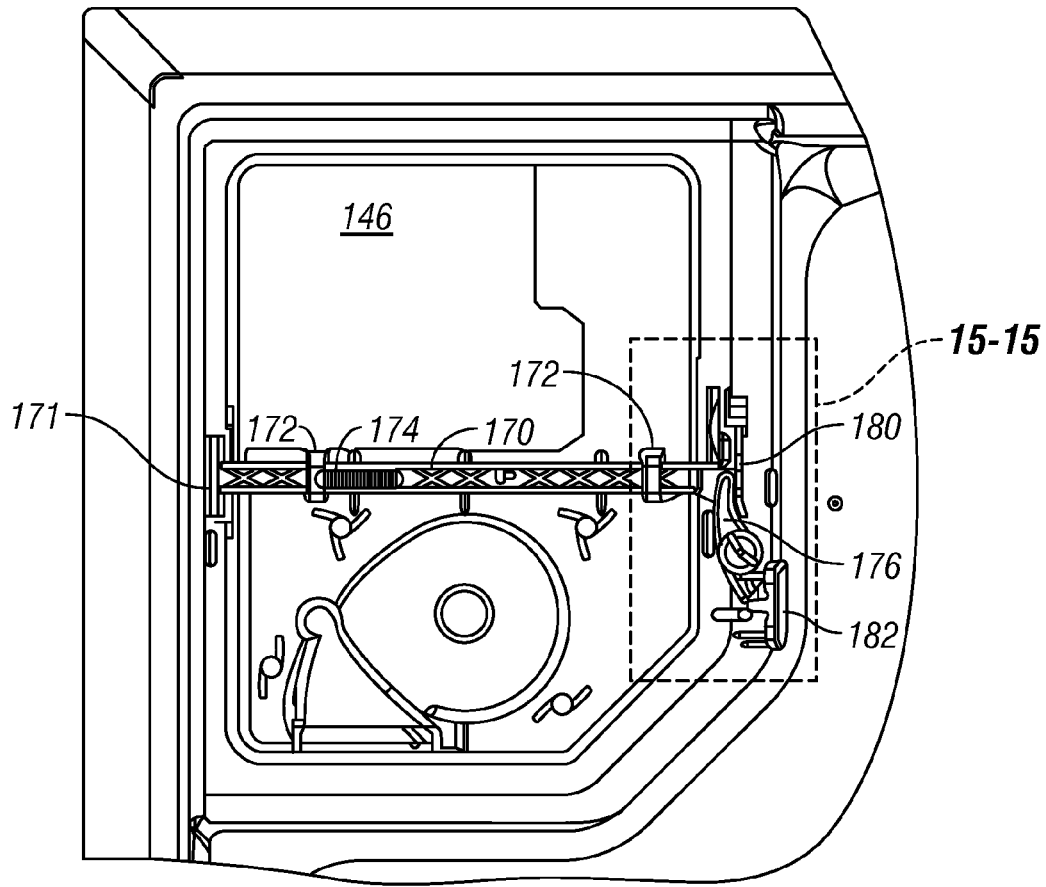
FIG. 14 is an elevation view of the ice bin assembly latch in the locked position.
Figure 15:
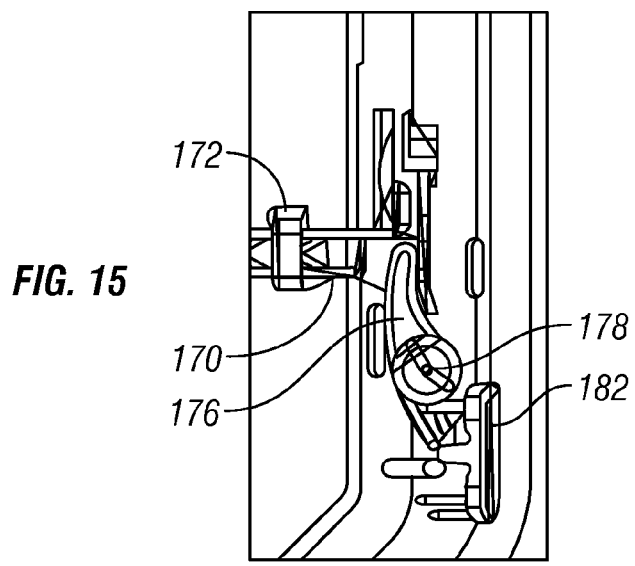
FIG. 15 is an enlarged view taken along lines 15-15 of FIG. 14.
Figure 16:
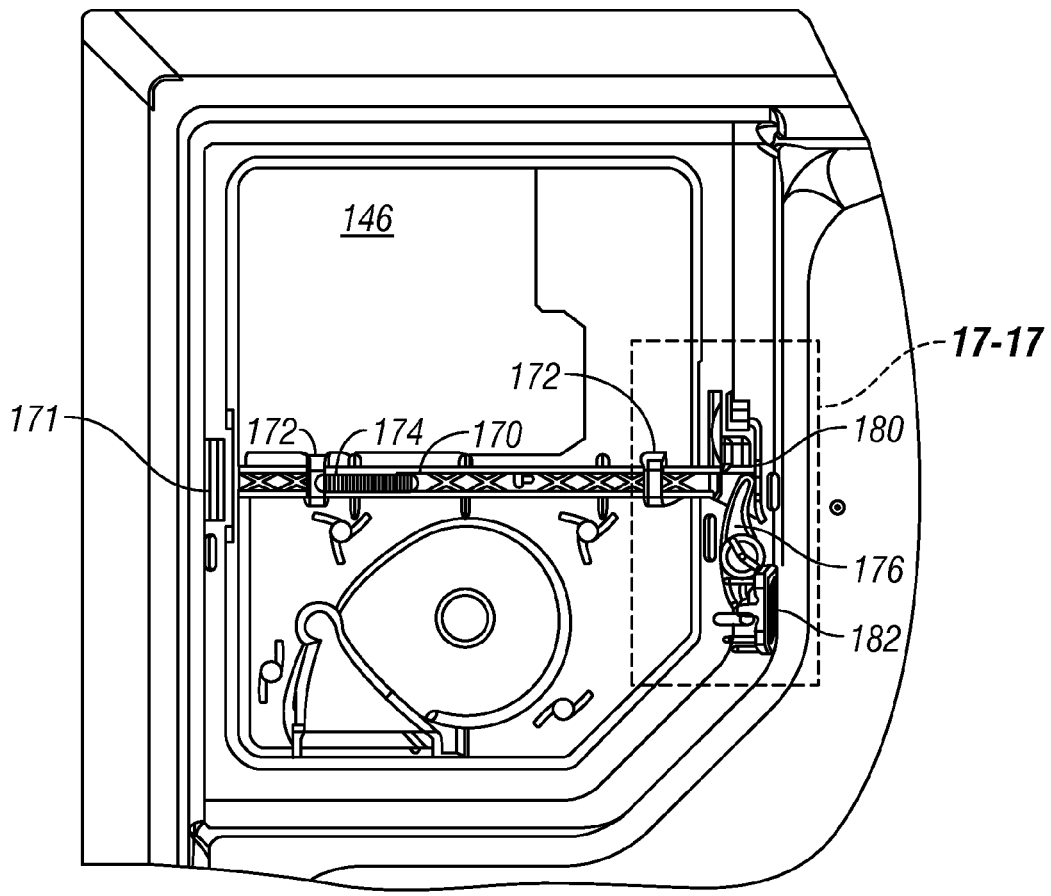
FIG. 16 is an elevation view of the ice bin assembly latch in the unlocked position.
Figure 17:
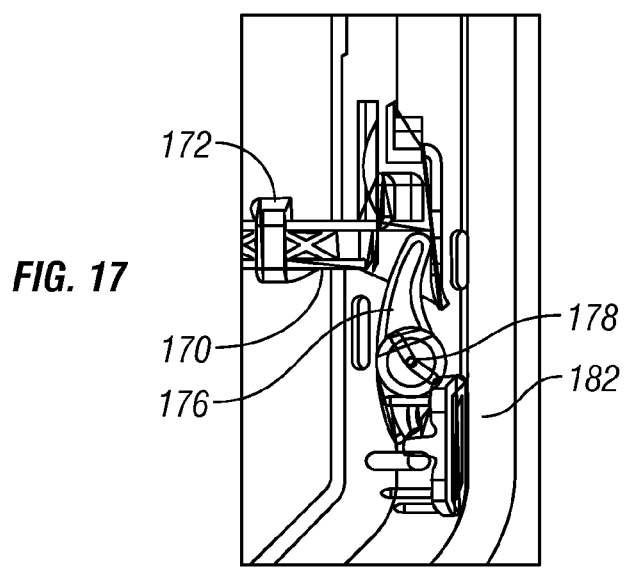
FIG. 17 is an enlarged view taken along lines 17-17 of FIG. 16.
Figure 18:
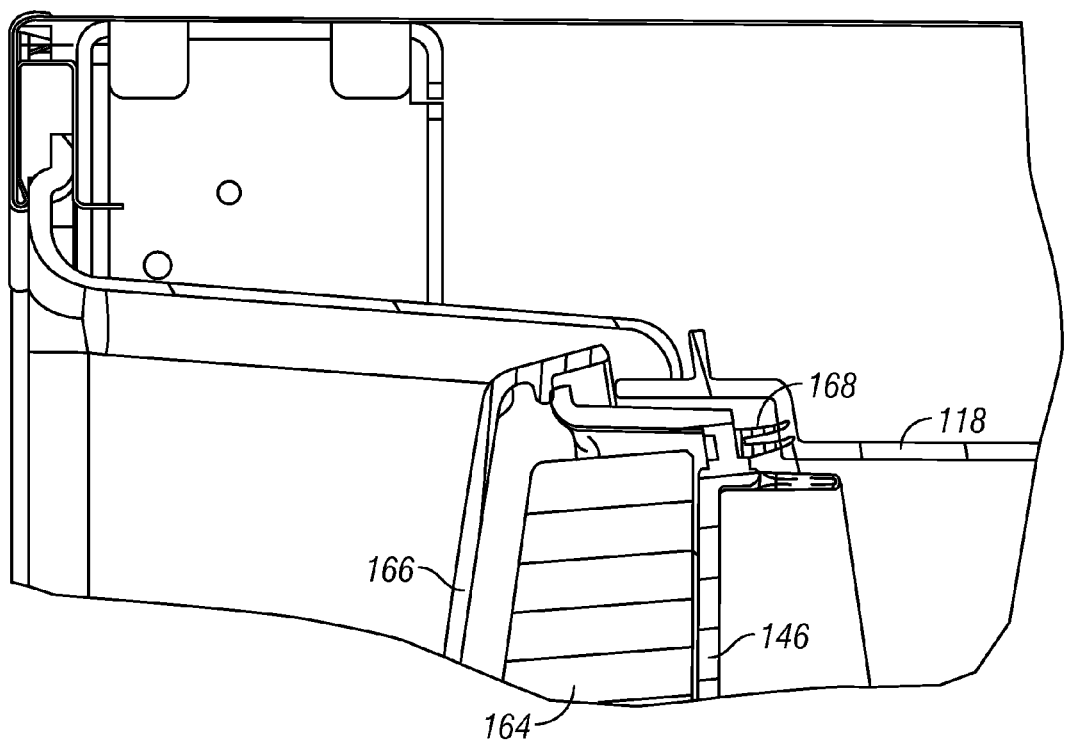
FIG. 18 is an enlarged partial view of the ice bin assembly seal.

The front cover 162 includes a latch mechanism for releasably locking the cover 162 to the ice compartment 22. The latch mechanism includes a lock bar 170 extending through a pair of collars 172 on the front plate 146 of the bin assembly 130 for lateral sliding movement between a locked position engaging a catch 171 on the wall of the ice compartment 22 (FIG. 14) and unlocked position disengaged from the catch 171 (FIG. 16). The lock bar 170 is normally biased to the locked position by a spring 174. A cam 176 is mounted on a peg 178 on the front plate 146 of the bin assembly 130 and is adapted to engage a flange or finger 180 on the end of the lock bar 170. The cam 176 overcomes the bias of the spring 74 when actuated by a finger button 182 mounted on the outer panel 166, so as to release the front cover 162 for removal of the bin assembly 130. Thus, the bin assembly 130 can be slid into the ice box 122 and positively retained by the latch bar 170 with an air-tight seal to maintain the temperature of the ice compartment 22. A user can depress the button 182 on the bin assembly 130 to unlock the lock bar 170 for removal of the bin assembly 130 from the ice box 122. The seal 168 prevents air movement at the juncture of the removable bin assembly 130 and the ice compartment 22. The latch bar 170 ensures that the bin assembly 130 is positively retained (FIGS. 14 and 15) when closed with a slight compression of the gasket seal 168 (FIG. 18).

Miscellaneous

Applicant's co-pending provisional application Ser. No. 60/613,241 filed Sep. 27, 2004, entitled APPARATUS AND METHOD FOR DISPENSING ICE FROM A BOTTOM MOUNT REFRIGERATOR, is hereby incorporated by reference in its entirety. This application and the provisional application both relate to a refrigerator with a bottom mount freezer and an icemaking compartment for making ice at a location remote from the freezer. However, it is understood that the ice compartment latch and seal of this application can also be used on a top mount or side-by-side refrigerator.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A refrigerator comprising:
    a fresh food compartment maintained at a temperature above 32 degrees F.;
    an icemaking compartment maintained at a temperature below 32 degrees F.;
    a freezer compartment located below the fresh food compartment, the freezer compartment maintained at a temperature lower than the temperature of the icemaking compartment;
    an ice bin removably mounted in the icemaking compartment;
    an icemaker in the icemaking compartment for supplying ice to the ice bin;
    a cold air duct having an inlet at a supply of cold air and an outlet in communication with the icemaker;
    a cover for selectively covering and permitting access to the ice bin and icemaker;
    a gasket between the cover and the icemaking compartment to prevent air movement between the icemaking compartment and the fresh food compartment;
    a releasable latch associated with the cover, the latch being adjustable between a locked position engaging a catch to thereby retain the cover in a position covering the icemaking compartment with the gasket compressed and an unlocked position disengaged from the catch to thereby permit the cover to be adjusted to permit access to the ice bin and icemaker such that the ice bin can be removed from the icemaking compartment;
    wherein a freezer compartment is located below the fresh food compartment and at a height lower than the icemaking compartment;
    a cold air duct having an inlet in communication with cold air from the freezer compartment and an outlet in communication with the icemaking compartment; and
    a return duct with an inlet in communication with the icemaking compartment and an outlet in communication with the freezer compartment.

2. The refrigerator of claim 1, wherein the ice compartment is not located on a door.

3. The refrigerator of claim 1, wherein the cover is fixed to the ice bin.

4. The refrigerator of claim 1, wherein the cover is insulated.

5. The refrigerator of claim 1, wherein the latch is connected to the cover.

6. A refrigerator comprising:
    a cabinet;
    a fresh food compartment disposed in the cabinet;
    a fresh food compartment door hingedly attached to the cabinet for at least partially covering and opening the fresh food compartment;
    an ice dispenser in the fresh food compartment door that dispenses ice through the fresh food compartment door;
    an icemaking compartment with an opening for receiving an ice bin, the ice bin being suitable for storing ice, the ice bin being removable from the icemaking compartment through the opening to transport ice within the bin to a location apart from the refrigerator;
    an icemaker in the icemaking compartment for supplying ice the ice bin;
    an ice moving member for moving ice from the ice bin to the ice dispenser;
    a cover adjustable into a closed position to cover the opening and form a barrier between the icemaking compartment and the fresh food compartment, the cover being adjustable into an open position to permit removal of the ice bin from the icemaking compartment through the opening and to permit access to the icemaker;
    a compressible seal between the cover and a wall of the icemaking compartment to prevent cold air from passing from the icemaking compartment into the fresh food compartment through the opening when the cover is in the closed position;
    a latch for retaining the cover in the closed position with the seal compressed between the cover and the ice compartment;
    a freezer compartment;
    wherein the icemaking compartment is maintained at a temperature lower than a temperature of the fresh food compartment and higher than a temperature of the freezer compartment;
    a cold air duct having an inlet in communication with cold air in the freezer compartment and an outlet in communication with the icemaking compartment for supplying cold air to the icemaker; and
    a return duct with an inlet in communication with the icemaking compartment and an outlet in communication with the freezer compartment.

7. The refrigerator of claim 6, wherein the freezer compartment is located below the fresh food compartment and at a height lower than the icemaking compartment.

8. The refrigerator of claim 6, wherein the icemaking compartment is fixed within the cabinet.

9. The refrigerator of claim 6, wherein the cover is fixed to the ice bin.

10. The refrigerator claim 6, wherein the cover is insulated.

11. The refrigerator of claim 6, wherein the ice moving member is a rotatable auger.

* * * * *